April 15, 1930.  J. ENDEBAK  1,754,353
ELECTRIC WELDING TOOL
Filed Nov. 26, 1927
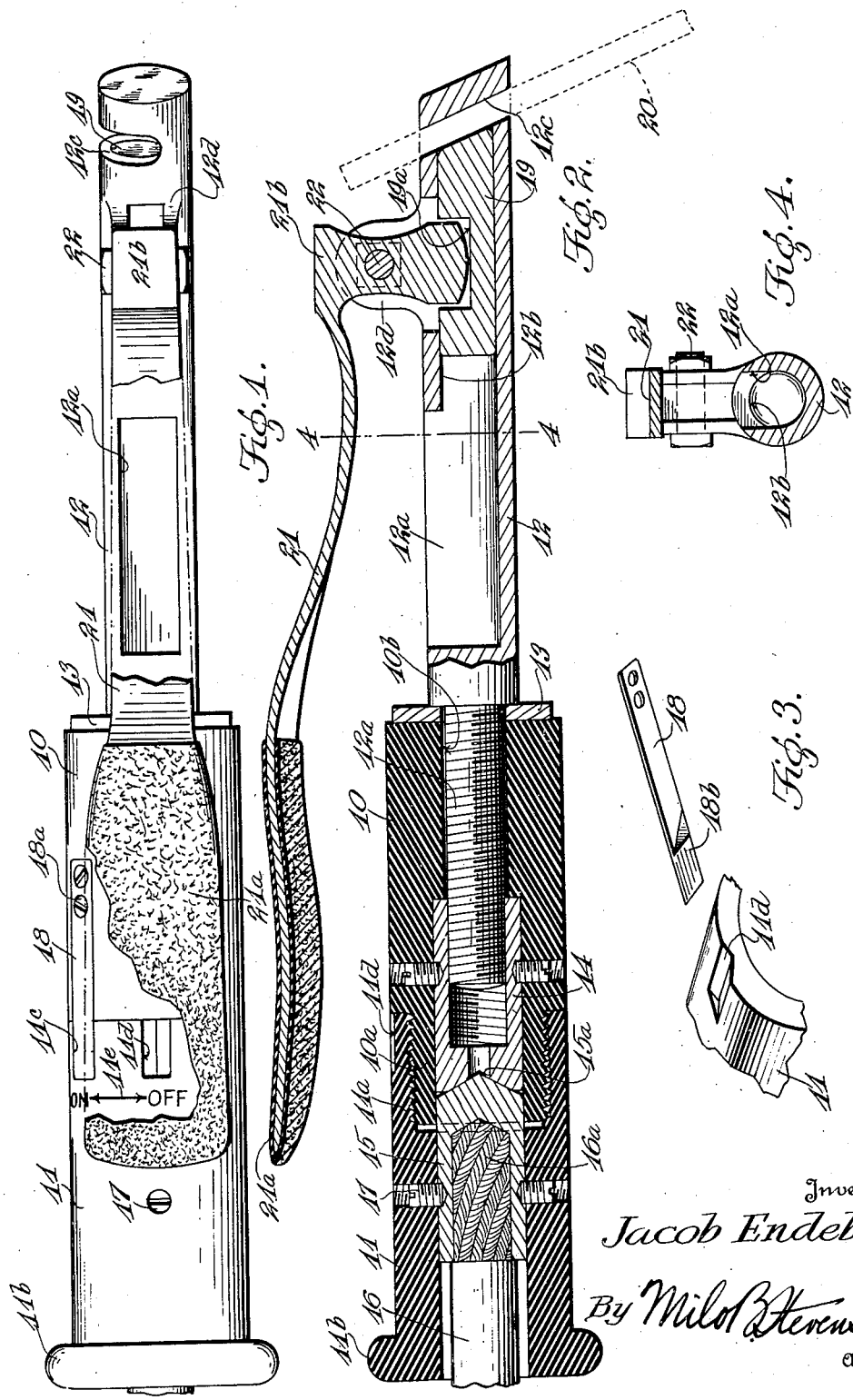
Inventor:
Jacob Endebak
By Milo Stevens Co.
Attorneys Patented Apr. 15, 1930

1,754,353

UNITED STATES PATENT OFFICE

JACOB ENDEBAK, OF CHICAGO, ILLINOIS

ELECTRIC WELDING TOOL

Application filed November 26, 1927. Serial No. 235,914.

This invention relates to tools used in electric arc welding, wherein a rod electrode is employed, and my main object is to provide in a tool of this kind a handy cut-off for the current.

A further object of the invention is to dispose the novel cut-off in the handle of the tool, saving steps and time to reach the regular switch for that purpose.

Another object of the invention is to provide an instant cut-off to enable the tool to be laid whenever desired on any object without danger of burning the same.

An important object of the invention is to embody the novel cut-off in the handle of the tool without adding to the bulk or altering the form of the same.

A final but nevertheless important object of the invention is to construct the novel tool of few and sturdy parts, conducive to inexpensive production and durability.

With the above objects in view and any others that may suggest themselves from the specification and claims to follow, a better understanding of the invention may be gained by reference to the accompanying drawing, in which—

Figure 1 is a plan view of the tool, with a lever element partly cut away;

Fig. 2 is a vertical section of the tool;

Fig. 3 is a group perspective view of a locking device; and

Fig. 4 is a cross-section taken on the line 4—4 of Figure 2.

Referring specifically to the drawing, it will be noted that the tool is generally composed of a handle, a shank and a lever above the same. The handle comprises a forward portion 10 reduced with a threaded nipple $10^a$ to screw into a receptacle $11^a$ formed in the rear portion 11. Outwardly, the handle appears as a plain elongated cylinder, preferably enlarged with a rear-end bead $11^b$ to check a tendency for the handle to slip out of the hand; and the handle as a whole is of solid vulcanite or other suitable insulating material.

The shank 12 is reduced with a threaded stem $12^a$ to first receive a washer 13, next loosely enter a bore $10^b$ in the forward handle portion, and finally screw into a brass or copper receptacle 14 embedded in the said handle portion.

The handle is also bored from the rear to snugly receive a brass or copper plug 15 in which is fused or otherwise sealed the bared end $16^a$ of the current cable 16. The receptacle 14 and the plug 15 are stationed in the respective handle portions by sunken setscrews 17, so that the receptacle 14 serves as a means to firmly secure the shank 12 to the forward handle portion, and the plug 15 has a similar effect upon the cable 16.

The inner end of the plug 15 is conically pointed as indicated at $15^a$ to seat in the correspondingly-recessed inner end of the receptacle 14 when the handle is screwed up, furnishing a direct current lead to the tool shank 12. However, should the rear portion of the handle be given a twist in the unscrewing direction, the current will be cut off from the shank.

In order that the connected and disconnected positions of the handle may be readily ascertained by a glance, I have cut the rear handle portion 11 of the handle with two laterally-spaced, shallow notches $11^c$ and $11^d$ adjacent the meeting line of the handle portions. Back of the respective notches I have carved or printed the legends "On" and "Off" with oppositely-pointed directional arrows $11^e$. The forward handle portion 10 has attached to it by screws $18^a$ or other means a metal spring-blade 18, which extends longitudinally to a position opposite the notches $11^c$ and $11^d$ and has a terminal shoe formation $18^b$ which—when the handle is screwed up or connected—seats in the "On" notch $11^c$, as shown, by virtue of the tension in the blade. Thus, when the handle portion 11 is twisted to disconnect, the blade 18 is crowded out of the notch $11^c$ and soon falls into the "Off" notch $11^d$, indicating that the tool is disconnected. The blade more properly serves as a lock to fix the tool in the desired electrical condition and prevent the accidental change of such condition, such as by the careless handling of the tool or by contact or friction of the handle with other objects. The manipulation of the handle is extremely simple, since the forward portion is usually held in the right hand and thus supported, while the left is used to twist the rear handle portion as desired.

The shank 12 is generally in the form of a round rod, but is hollowed out at 12ª and further formed with a bore 12ᵇ for the insertion and slidable disposal of a plunger 19. The forward end of the shank is recessed from the side—as indicated at 12ᶜ— to expose the forward end of the plunger and receive the electrode rod 20 denoted by dotted lines. Forward pressure of the plunger against the rod 20 holds the same in the pocket formed by the recess 12ᶜ. This pressure is induced by the hand which supports the tool through the agency of a lever 21 alongside the latter. The thumb of the hand draws upon the rear portion of the lever, which is in the nature of a handle and is jacketed with an insulation fabric or covering 21ª. The forward portion of the lever 21 is enlarged to form a head 21ᵇ, which is pivoted at 22 in bearing flanges 12ᵈ extended upwardly from the shank 12 opposite the site of the plunger 19. The base portion of the head 21ᵇ depends into a depression 19ª in the top of the plunger, and forms a heel to advance or retract the plunger when pressure is applied to or released from the lever 21. Owing to the extreme length of the head 21ᵇ, a leverage of great advantage is secured, so that but little pressure is required to firmly hold the electrode rod 20 in the tool.

It will be seen that I have provided in the above-described tool an article of high utility. While the tool with its electrode rod are easily held in operative position by one hand, the rod may, by the mere release of the lever, be dropped out of the tool when it has become too short or otherwise unfit for use, eliminating special attention or parts in that connection. Yet, should the insertion of a new electrode rod be required, a short twist of the rear portion of the tool handle cuts off the current, enabling the exposed portions of the tool to be handled with safety and the tool to be laid on any object momentarily without danger of short-circuiting or burning by contact. While incorporating the novel switching device, the tool remains compact and devoid of delicate parts apt to get out of order. At the same time my improvements are of exceeding simplicity, enabling the tool to be produced at a reasonable cost.

I claim:—

1. An electric welding tool comprising a handle separable into sections adapted to be grasped by the hand and a shank, an electrical terminal disposed in each section and the sections of the handle effecting an electrical connection when joined.

2. An electric welding tool comprising sections terminally joined by screw-threading to form a handle, a current-lead in one of said sections and having a terminal, and a shank carried by the other section and having a terminal, said terminals being in opposed relation and adapted to connect electrically when the sections are screwed together.

3. An electric welding tool comprising an elongated section of insulation formed with a threaded terminal reduction, an extension section of insulation formed with a terminal tapped bore into which said reduction is threaded to compose a handle, a current-lead in one of said sections and having a terminal, a shank carried by the other section and having a terminal, said terminals being in opposed relation and adapted to connect electrically when the sections are screwed together and to break contact as unscrewed, and an external indicating device for the connected and disconnected conditions of the handle.

4. An electric welding tool comprising an elongated section of insulation formed with a threaded terminal reduction, an extension section of insulation formed with a terminal tapped bore into which said reduction is threaded to compose a handle, a current-lead entering one of said sections, a terminal-plug fitted in the same section to receive said current-lead, a shank carried by the other section, a terminal plug fitted in the latter to receive said shank, said terminal plugs being in opposed relation and adapted to connect electrically when the sections are screwed together, and sunken securing devices for said terminal-plug disposed in the walls of said sections.

5. An electric welding tool comprising a shank, a handle having sections adapted to be grasped by the hand screw threaded together, and electrical terminals in the sections of the latter, such terminals connecting by a twist of one section in one direction and disconnected by a twist of the same in the opposite direction.

6. An electric welding tool comprising a shank, a sectional handle, electrical terminals in the sections of the latter, such terminals connected by a twist of one section in one direction and disconnected by a twist of the same in the opposite direction, and a tension device on one section and projecting upon the other, the latter having receptacles for said tension device at the limits of the twisting operations to lock the handle sections at the corresponding positions.

In testimony whereof I affix my signature.

JACOB ENDEBAK.